United States Patent [19]
Wijnaendts Van Resandt et al.

[11] Patent Number: 6,002,509
[45] Date of Patent: Dec. 14, 1999

[54] BEAM SCANNER FOR CONFOCAL MICROSCOPES

[75] Inventors: Roelof W. Wijnaendts Van Resandt, Bad Schonborn; Joachim Jehle, Heidelberg; Johann Engelhardt, Bad Schonborn, all of Germany

[73] Assignee: Leica Lasertechnik GmbH, Heidelberg, Germany

[21] Appl. No.: 08/817,618

[22] PCT Filed: Oct. 21, 1995

[86] PCT No.: PCT/US95/01463

§ 371 Date: Apr. 17, 1998

§ 102(e) Date: Apr. 17, 1998

[87] PCT Pub. No.: WO96/12982

PCT Pub. Date: May 2, 1996

[51] Int. Cl.⁶ .................................................. G02B 26/02
[52] U.S. Cl. .......................... 359/234; 359/230; 359/368
[58] Field of Search ........................................ 359/230, 234, 359/236, 368, 384, 385

[56] References Cited

FOREIGN PATENT DOCUMENTS

| 0 539 691 A2 | 5/1993 | European Pat. Off. ........ G02B 21/00 |
| 42 07 760 A 1 | 9/1993 | Germany .......................... A61B 3/10 |
| WO 91/13379 | 9/1991 | WIPO ............................ G02B 21/00 |

Primary Examiner—James Phan
Attorney, Agent, or Firm—Simpson, Simpson & Snyder

[57] ABSTRACT

A beam scanner is disclosed for confocal microscopes. The beam scanner is provided with a disc-shaped, rotary-driven base unit which largely prevents disruptive optical scattering. The beam scanner is so designed that at least one main surface of the base unit is provided with a reflecting grid; light is reflected only by those regions of the main surface which correspond to the meshes of the reflecting grid, or only by those regions which correspond to the lattice of the reflecting grid.

24 Claims, 2 Drawing Sheets

BEAM SCANNER FOR CONFOCAL MICROSCOPES

BACKGROUND OF THE INVENTION

The invention involves a beam scanner for confocal microscopes with a rotary-drive disk as a base.

Beam scanners with disk-shaped, rotary-drive bases so-called disk scanners, have been used for several years in confocal microscopy. In the confocal microscopic imaging procedure only the structures of an object that are directly in the focal plane of the microscope objective are displayed. In a confocal optical arrangement the object is illuminated in the focal plane by a point light source. The light coming from the object is reflected by a beam splitter in the direction of a point light detector and detected. In this regard the point light source, point light detector, and the limited-diffraction light point on the object in the focal plane lie exactly in the optically conjugate points. Light that comes from outside the focal plane is not focussed sharply on the point light detector and hence is also not registered by the detector. For this reason there are no inputs from unfocussed parts of the object. Object parts that lie outside the focal plane are thus almost faded out. In practice very small pinhole apertures are used for the light source and point light detector. In order now to produce a three-dimensional image of an object, the light point must be guided relative to the object in an appropriate manner. One possibility for this is to use a multipoint scanner in the form of a Nipkow disk. This is a disk driven with an electric motor and having a grid of tiny apertures, so-called pinholes. A problem that occurs in practice in using the known disk scanner involves the light reflected back from the upper surface of the disk that falls on the eyepiece and irradiates or at least affects adversely the image of the object. Avoiding this kind of scattered light effects often requires substantial expenditure on apparatus. In addition, the use of a Nipkow disk as a beam scanner requires relatively expensive auxiliary optics because of the diffraction phenomena that occur at the pinhole apertures.

SUMMARY OF THE INVENTION

The invention has the objective of indicating a beam scanner for confocal microscopes of the kind initially mentioned having auxiliary optics that are relatively inexpensive in comparison to the auxiliary optics of Nipkow disks and that can be connected to a conventional microscope.

The beam scanner in accordance with the invention achieves the above objective through the characteristics describe in the present specification. According to it the beam scanner that was initially mentioned is designed in such a way that at least one main upper surface of the disk has a reflection raster in which the repetitive, reflecting pattern elements, i. e. either the zones corresponding to the mesh of the reflection raster or only the zones of the upper surface corresponding to the grid of the reflection raster reflect light.

In accordance with the invention it is recognized that the realization of a point light source or a point light detector is essential for the operation of a beam scanner.

The beam scanner in accordance with the invention can be used just like the known Nipkow disk as a point light source and point light detector.

In place of a raster-like arrangement of pinhole apertures in the base, a main upper surface of the beam scanner in accordance with the invention has a reflection raster. Normally a raster consists of a grid and the meshes formed by this grid. Below—just for the simplification of the explanations—it will always be assumed that only the meshes reflect light, although in principle only the areas corresponding to the grid also could reflect light.

Depending on the layout of the reflection raster, the individual meshes may lie closer to one another or farther apart, which has an effect on the signal to noise ratio, since through every mesh a small part of the light of the neighboring meshes from unfocussed object areas also is detected. The resolving power also depends on the design of the reflection raster, namely on the geometry of the individual meshes. Round, oval, or angular point-shaped meshes have been found advantageous in practice. Striped or linear meshes analogous to the known slit scanners are also conceivable. To minimize light scattering it is proposed to design the reflection raster with a striated pattern. For uniform illumination of the image it is proposed to design the pattern in a spiral shape.

Along with the various possibilities for the geometric design of the reflection raster there is also the possibility for the reflection raster to have color-selective properties in that it reflects only light in a certain range of wave lengths. In the field of the microscopy of structures marked with fluorescence in particular, the use of light in a certain range of wave lengths is advantageous, since the structures marked with fluorescence are stimulated only by the light of certain wave lengths. In this connection it has been shown that the spot sizes too, i. e. the size of the reflecting meshes, can be varied simply depending on the wave length of the incident light when the meshes of the reflection raster comprise a plurality of reflection areas with differing color-selective properties. The reflection areas of the individual meshes are advantageously arranged concentrically or symmetrically. If, for example, the inner reflection area of a mesh reflects both short-wave and long-wave light and the outer reflection area reflects exclusively long-wave light, then a larger spot size for long-wave light than for short-wave light can be implemented. In optimizing image quality, one must always take into consideration along with the objective magnification and the resolving power of the objective the fact that although the light transmission is larger, the larger the reflecting spot is, the resolution becomes worse in the process.

In confocal microscopes interchangeable objects with varying objectives magnifications are used. It has been shown that especially good object depictions can be achieved when the raster size of the beam scanner is coordinated with the objective magnification. In an advantageous embodiment of the beam scanner in accordance with the invention the main upper surface of the base therefore has a plurality of areas, preferably a plurality of ring zones, with differing reflection rasters. The differences in this regard can relate to the raster size and/or the color-selective properties of the reflection raster.

There are thus various possibilities for designing a beam scanner in accordance with the invention. In an advantageous embodiment the base consists of a material that is essentially transparent, preferably a non-reflecting glass or quartz disk. The anti-reflection process serves to avoid unwanted back reflections. Another possibility is to use a base with a relatively large absorption capacity. The absorption capacity must be so large that light is reflected only at the reflection raster of the main upper surface of the base.

It is especially advantageous to design the reflection raster as a coating of the main upper surface of the disk. Many processes for applying thin coatings on corresponding bases are known from practice. For example, vacuum deposition and sputtering of thin coatings can be mentioned here in which subsequently the reflection raster can be installed in a photolithographic etching process. Another possibility is the use of masks during the vacuum deposition or sputtering of a thin coating. Correspondingly the meshes of the reflection raster thus can be designed in each case as a coating spot that is transparent for light of a certain wave-length range and otherwise reflecting. In an advantageous manner the meshes of the reflection raster are formed by a plurality of overlapping coating spots that are transparent for light of different wave-length ranges, the coating spots of the individual meshes being preferably applied centered one over the other on the disk. In a concrete, especially advantageous embodiment of a beam scanner of this kind the individual meshes are formed through two coating spots in each case applied centered one on top of the other, the first coating spot applied on the disk being transparent for short-wave light and reflecting long-wave light, while the second coating spot reflects short-wave and long-wave light and is made smaller than the first coating spot.

Along with the beam scanner in accordance with the invention described above, a scanning apparatus for confocal microscopes with at least one light source, an eyepiece, and the beam scanner in accordance with the invention is also proposed, which in addition comprises at least one beam-deflecting optical component that may be arranged either in the light path between the light source and the eyepiece on the one side and the beam scanner on the other or else between the beam scanner and the object to be investigated. In addition there is also the possibility of arranging a plurality of beam-deflecting optical components in various positions in the light path. This beam-deflecting optical component can, for example, comprise a mirror or dichroic beam splitter or also a compound lens or a combination of all these elements. It may also be advantageous to use a reflecting prism that could be arranged in the light path in such a way that a first reflecting upper surface is arranged in the light path between the light source and the eyepiece on the one side and the beam scanner on the other side and a second reflecting upper surface is arranged between the beam scanner and the object to be investigated.

In scanning apparatus with beam scanners that have a plurality of zones with differing reflection rasters it makes sense if the position of the beam scanner can be changed within the optical device in such a manner that one of the reflection rasters is optionally arranged in the light path.

In a quite especially advantageous variant the proposed scanning apparatus is conceived as an accessory module with a housing for conventional microscopes. Microscopes of this kind can also simply be refitted or equipped with the proposed scanning apparatus for confocal microscopy.

BRIEF DESCRIPTION OF THE DRAWINGS

There are thus various possibilities for developing and furthering the teaching of the invention in question in an advantageous manner. For this reference can be made to the subsequent explanation of an exemplary embodiment of the invention using the drawing. In connection with the explanation of the preferred exemplified embodiment of the invention based on the drawing, preferred developments and elaborations of the teaching are also explained. The drawing shows FIG. 1 schematic portrayal of a confocal disk scanner in accordance with the invention in a reflection arrangement in the framework of a scanning apparatus for a microscope and FIG. 2 top plan view of a beam scanner formed in accordance with a preferred embodiment of the present invention.

DETAILED DESCRIPTION OF THE PREFERRED EMBODIMENTS

Figure 1:
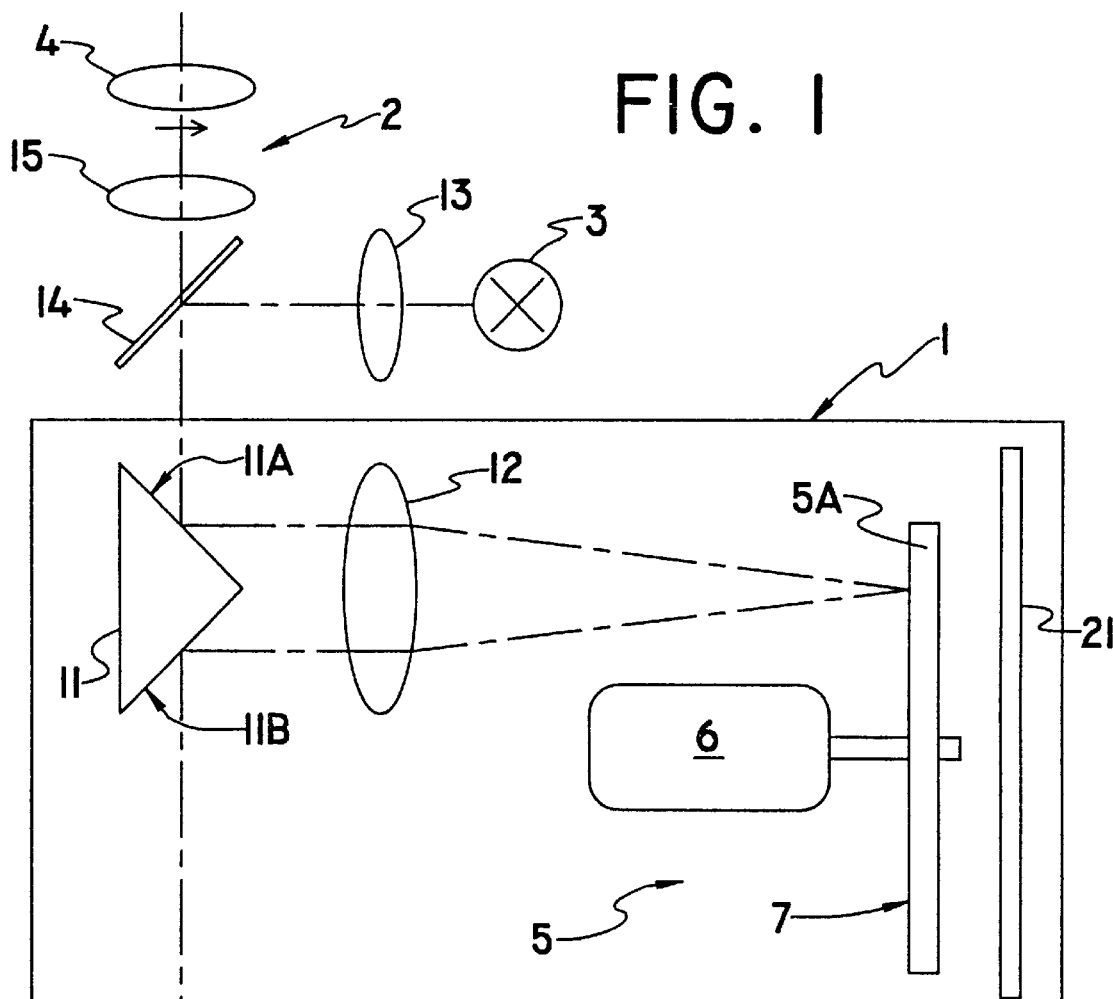
Figure 2:
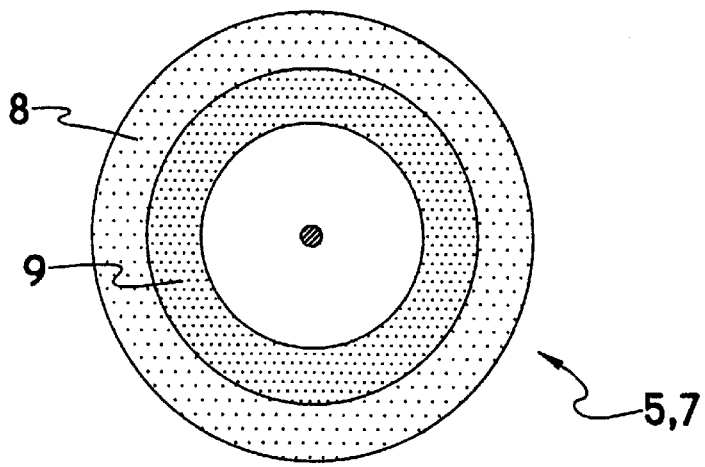

FIG. 1 shows a scanning apparatus 1 for a confocal microscope 2 that comprises a light source 3 and an eyepiece 4. An essential component of the scanning apparatus I is a beam scanner 5, which is portrayed in a top view again by itself in FIG. 2. The beam scanner 5 comprises a disk 5A that is rotated with the aid of a motor 6 as a base.

In accordance with the invention a main upper surface 7, namely the main upper surface 7 portrayed in FIG. 1, is provided with a reflection raster 8, 9. The reflection rasters 8, 9 consists of a grid and the meshes formed by the grid. In the exemplified embodiment portrayed here, only the areas of the main upper surface 7 corresponding to the meshes reflect light.

In the embodiment portrayed here the main upper surface 7 of the disk 5A has a plurality of ring zones with different reflection rasters 8 and 9. Although the reflection rasters 8, 9 do not differ significantly in the shape of their point-shaped meshes, they do differ substantially in the raster size i. e. in the size of the meshes and in the mesh intervals. Thus the meshes of the reflection raster 9 in the inner ring zone are substantially smaller than the meshes of the reflection raster 8 in the outer ring zone.

In addition, the reflection rasters 8 and 9 may also differ in their color selection properties in that the reflection rasters 8 and 9 each reflect light of a specific and in fact different wave length range.

The disk 5A of the beam scanner 5 that is portrayed here consists of a material that is essentially transparent, namely a non-reflecting glass disk. The reflection rasters 8 and 9 are designed as a coating of the displayed main upper surface 7 of the disk 5A which is explained in greater detail in connection with FIG. 3.

A light trap 21 is preferably provided behind disk 5A for absorbing light transmitted through the disk to further prevent unwanted reflections within the scanning apparatus.

Along with the beam scanner 5 in accordance with the invention the scanning apparatus 1 also comprises a beam deflecting optical component, which here is arranged in the light path between the light source 3 and the eyepiece on the one side and the beam scanner 5 on the other hand, and also between the beam scanner 5 and an object 10 to be investigated. In the exemplified embodiment portrayed here a reflecting prism 11 in connection with a lens 12 serves as a beam-deflecting component.

With the aid of the scanning apparatus 1 the light emitted by the light source 3 is first guided via a lens 13 and a dichroic beam splitter 14 to an upper surface 11A of a reflecting prism. The latter reflects the light beam, which is directed via the lens 12 to the main upper surface 7 having the reflection raster 8 or 9 of the beam scanner. Through reflection from the main upper surface 7 of the beam scanner and via the lens 12 and further reflection from a second upper surface 11B of the reflecting prism 11, the light reflected by the beam scanner 5 finally reaches the object 10. The light path of the light reflected from the object 10 correspondingly runs in the reverse direction, except that this light passes through the dichroic beam splitter 14 via a lens 15 to the eyepiece 4. Here the beam scanner serves as both a point light source and a point light detector.

In connection with FIG. 1 it should be noted that the scanning apparatus 1 can be conceived advantageously as an accessory module with a housing, which is indicated here, for conventional microscopes.

Figure 3:
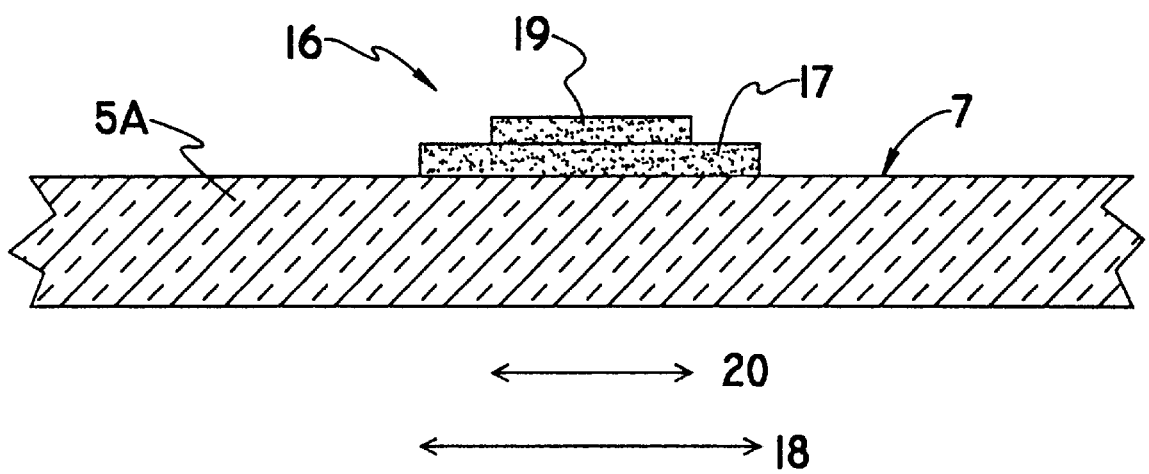
FIG. 3 enlarged schematic sectional portrayal of the construction of the beam scanner in accordance with the invention portrayed in FIG. 1.

FIG. 3 shows a possibility of realizing a beam scanner as it is proposed in accordance with the invention. In the exemplified embodiment portrayed here the beam scanner comprises a disk 5A made from a transparent material, namely out of non-reflecting glass. The reflection raster, or more particularly or the individual meshes 16 of the reflection raster, are designed as a coating of the main upper surface 7 of the disk 5A. Here only one mesh is portrayed as an example. The mesh 16 is formed by two coating spots 17 and 19 that are centered one over the other. The first coating spot 17 applied on the disk 5A has a larger reflection diameter than the second coating spot 19, which is made clear by the double arrows 18 and 20. The first coating spot 17 is transparent for short-wave light and reflects long-wave light, while the second coating spot 19 reflects short-wave and long-wave light. The two coating spots 17 and 19 are applied centered one over the other on the disk 5A. With the aid of the reflection raster portrayed in FIG. 3 especially well distinguished spot sizes or mesh sizes for short-wave and long-wave light can be realized.

With regard to further characteristics of the reflection raster in accordance with the invention and the proposed scanning apparatus that are not portrayed in the figures, reference is made to the summary part of the specification.

In conclusion it should be noted that the invention in no way is restricted to the exemplified embodiment portrayed and explained in the figures. The teaching of the invention in question can also be realized through beam scanners that are designed with a different construction and reflection rasters with different kinds of geometries.

We claim:

1. A beam scanner for a confocal microscope comprising:
   a non-reflective disk and drive means for rotating said disk about an axis of rotation; and
   a reflection raster applied to a main upper surface of said disk, wherein said reflection raster is color-selective to only reflect light of a predetermined wavelength range.

2. The beam scanner according to claim 1, wherein said main upper surface of said disk includes a plurality of different reflection rasters.

3. The beam scanner according to claim 2, wherein each of said plurality of reflection rasters is provided on a different ring area of said disk.

4. The beam scanner according to claim 1, wherein said disk is made of a transparent material.

5. The beam scanner according to claim 4, wherein said transparent material is non-reflecting glass.

6. The beam scanner according to claim 4, wherein said transparent material is quartz.

7. The beam scanner according to claim 1, wherein said disk is made of a material of high absorption capacity, whereby incident light is reflected only from said reflection raster.

8. A beam scanner for a confocal microscope comprising:
   a non-reflective disk and drive means for rotating said disk about an axis of rotation; and
   a reflection raster applied to a main upper surface of said disk, wherein said reflection raster includes a plurality of meshes surrounded by a grid, and only the areas corresponding to said plurality of meshes reflect light, and said reflection raster is color-selective to only reflect light of a predetermined wavelength range.

9. The beam scanner according to claim 8, wherein each of said plurality of reflective meshes includes a plurality of reflective areas for reflecting different predetermined wavelength ranges.

10. The beam scanner according to claim 9, wherein said plurality of reflective areas of a mesh are concentrically arranged.

11. A beam scanner for a confocal microscope comprising:
    a non-reflective disk having a main surface,
    drive means for rotating said disk about an axis of rotation; and
    a plurality of different reflection rasters applied to respective areas of said main surface of said disk.

12. The beam scanner according to claim 11, wherein each of said plurality of reflection rasters is provided on a different ring area of said disk.

13. A beam scanner for a confocal microscope comprising:
    a non-reflective disk and drive means for rotating said disk about an axis of rotation; and
    a reflection raster applied to a main upper surface of said disk, wherein said disk is made of a material of high absorption capacity, whereby incident light is reflected only from said reflection raster.

14. A beam scanner for a confocal microscope comprising:
    a non-reflective disk and drive means for rotating said disk about an axis of rotation; and
    a reflection raster applied as a coating to a main upper surface of said disk, wherein said reflection raster includes a plurality of meshes surrounded by a grid, only the areas corresponding to said plurality of meshes reflect light, and each of said plurality of meshes comprises a coating spot that is transparent for light of a predetermined wavelength range and otherwise reflecting.

15. The beam scanner according to claim 14, wherein each of said plurality of meshes comprises plurality of overlapping coating spots that are transparent for light of various predetermined wavelength ranges and otherwise reflecting.

16. The beam scanner according to claim 15, wherein said plurality of overlapping coating spots are applied as concentric coating layers.

17. The beam scanner according to claim 16, wherein said plurality of overlapping coating spots includes a first coating spot applied directly to said main upper surface of said disk and a second coating spot smaller than said first coating spot applied overtop said first coating spot.

18. The beam scanner according to claim 17, wherein said first coating spot is transparent for short-wave light and reflects long-wave light, while said second coating spot reflects short-wave and long-wave light.

19. A scanning device for a confocal microscope having an eyepiece, a light source, and a light path extending from said light source to said eyepiece by way of an object to be observed, said scanning device comprising:
    a beam scanner including a non-reflective disk having a reflective raster applied to a main surface thereof and drive means for rotating said disk about an axis of rotation normal to said main surface; and
    first beam-deflecting means aligned on said light path for directing illuminating light from said light source to said reflective raster, and for directing object-reflected light from said reflective raster to said eyepiece; and second beam-deflecting means aligned on said light path for directing said illuminating light from said reflective raster to said object, and for directing said object-reflected light from said object to said reflective raster.

20. The scanning device according to claim 19, wherein said first beam-deflecting means comprises a first reflective surface of a prism, and said second beam-deflecting means comprises a second reflective surface of said prism.

21. The scanning device according to claim 20, wherein said first and second beam-deflecting means further include a compound lens between said prism and said reflective raster.

22. The scanning device according to claim 19, wherein said beam scanner includes a plurality of reflective rasters applied to different areas of said main surface, and said beam scanner is movable within said scanning device to select a chosen one of said plurality of reflective rasters.

23. The scanning device according to claim 19, wherein said scanning device is an accessory module adapted for selective attachment to a conventional microscope housing.

24. The scanning device according to claim 19, further including a light trap behind said disk for absorbing light transmitted through said disk.

* * * * *